United States Patent
Growney et al.

(10) Patent No.: US 7,062,460 B1
(45) Date of Patent: Jun. 13, 2006

(54) ON-LINE AUCTION METHOD AND SYSTEM FACILITATING THE SALE OF MULTIPLE PRODUCT UNITS AT PRICES VARYING WITH VOLUME

(75) Inventors: Kevin Growney, San Francisco, CA (US); Patrick L. Youssi, San Francisco, CA (US)

(73) Assignee: Enduse.com LLC, San Francisco, CA (US)

( * ) Notice: Subject to any disclaimer, the term of this patent is extended or adjusted under 35 U.S.C. 154(b) by 0 days.

(21) Appl. No.: 09/417,459

(22) Filed: Oct. 12, 1999

(51) Int. Cl.
*G06F 17/60* (2006.01)
*G06F 17/00* (2006.01)

(52) U.S. Cl. .............................. 705/37; 705/1; 705/26; 705/27; 705/80; 705/400

(58) Field of Classification Search ............... 705/1, 705/26, 37, 80, 400, 27
See application file for complete search history.

(56) References Cited

U.S. PATENT DOCUMENTS

| | | | | |
|---|---|---|---|---|
| 3,581,072 | A | 5/1971 | Nymeyer | 705/37 |
| 4,789,289 | A | 12/1988 | Wilson | 414/24.6 |
| 4,903,201 | A | 2/1990 | Wagner | 364/408 |
| 5,077,665 | A | 12/1991 | Silverman et al. | 364/408 |
| 5,394,324 | A | 2/1995 | Clearwater et al. | 364/402 |
| 5,640,569 | A | 6/1997 | Miller et al. | 395/729 |
| 5,715,402 | A * | 2/1998 | Popolo | 395/237 |
| 5,774,873 | A | 6/1998 | Berent et al. | 705/26 |
| 5,794,219 | A | 8/1998 | Brown | 705/37 |
| 5,826,244 | A | 10/1998 | Huberman | 705/37 |
| 5,835,896 | A * | 11/1998 | Fisher et al. | 705/37 |
| 5,890,138 | A | 3/1999 | Goden et al. | 705/26 |
| 5,905,974 | A | 5/1999 | Fraser et al. | 705/37 |
| 5,905,975 | A | 5/1999 | Aushubel | 705/37 |
| 5,924,083 | A | 7/1999 | Silverman et al. | 705/37 |
| 5,974,403 | A * | 10/1999 | Takriti et al. | 705/412 |
| 6,058,379 | A * | 5/2000 | Odom et al. | 705/37 |
| 6,058,417 | A * | 5/2000 | Hess et al. | 709/219 |
| 6,119,100 | A * | 9/2000 | Walker et al. | 705/20 |
| 6,131,087 | A * | 10/2000 | Luke et al. | 705/26 |

(Continued)

FOREIGN PATENT DOCUMENTS

| | | |
|---|---|---|
| CA | 2 329 281 * | 6/2002 |
| EP | 1170 691 A1 * | 7/2001 |
| GB | 2 363 483 A * | 12/2001 |
| WO | WO 00/73965 A1 * | 12/2000 |

OTHER PUBLICATIONS

Jeffrey Teich, et al., A Multiple Unit Auction Algorithm: Some Theory and a Web Implementation, Electronic Markets, vol. 9, Iss 3, Jul. 1999, pp. 199–205.*

(Continued)

*Primary Examiner*—Richard Chilcot
*Assistant Examiner*—J. Harle
(74) *Attorney, Agent, or Firm*—Innovation Management Sciences; Wilfred Lam

(57) ABSTRACT

An online auction system for auctioning off products includes a server system, plural buyer systems, and plural seller systems. The server system comprises a seller interface, a buyer interface, a price adjustment mechanism, and a bid manager. The seller interface performs an online bid setup process including obtaining, from a given seller system, price varying information and quantity information corresponding to the price varying information. The buyer interface communicates, to select buyer systems, bid information and product information, and accepts from a given buyer system a given quantity needed and a given bid. The price adjustment mechanism determines a given parity price for the given buyer, which varies according to the given quantity needed. The bid manager defines a given winning bid for the given buyer as a function of the given parity price and a rank of the given buyer in relation to other buyers.

22 Claims, 14 Drawing Sheets

U.S. PATENT DOCUMENTS

| | | | |
|---|---|---|---|
| 6,141,653 A * | 10/2000 | Conklin et al. | 705/80 |
| 6,269,343 B1 * | 7/2001 | Pallakoff | 705/26 |
| 6,449,601 B1 * | 9/2002 | Friedland et al. | 705/37 |
| 2001/0032167 A1 * | 10/2001 | Tulloch et al. | 705/37 |
| 2002/0032621 A1 * | 3/2002 | Smith et al. | 705/27 |
| 2002/0099631 A1 * | 7/2002 | Vanker et al. | 705/28 |
| 2002/0174060 A1 * | 11/2002 | Friedland et al. | 705/37 |

OTHER PUBLICATIONS

Jeffrey Teich, et al. Multiple–issue auction and market algorithms for the world wide web, Decision Support Systems, vol. 29, Jul. 1999, pp. 49–66.*

Rafael Tenorio, On Strategic Quantity Bidding in Multiple Unit Auctions, The Journal of Industrial Economics, vol. XLV, No. 2, Jun. 1997, pp. 207–217.*

Carrie Bean and Arie Segev, Auctions on the Internet, Working Paper 98–WP–1032, The Fisher Center for Management and Information Technology, Haas School of Business, University of California, Berkeley, Nov. 1998 (Revised), pp. 1–30.*

Rafael Tenorio, Revenue Equivalence and Bidding Behavior in a Multi–Unit Auction Market: An Empirical Analysis, The Review of Economics and Statistics, May, 1993, 302–314.*

Kevin A. McCabe, et al., Auction Institutional Design: Theory and Behavior of Simultaneous Multiple–Unit Generalizations of the Dutch and English Auctions, The American Economic Review, vol. 80, No. 5, Dec., 1990, pp. 1276–1283.*

Michael H. Rothkopf, et al., Computationally Manageable Combinational Auctions, Management Science, vol. 44, No. 8, Aug. 1998, pp. 1131–1147.*

Robert A. Feldman and Rajnish Mehra, Auctions: A Sampling of Techniques, Finance and Development, vol. 30, No. 3, p. 32.*

Fan Ming, et al. Creating Electronic Markets, Dr. Dobb's Journal, vol. 23, Iss. 11, p. 52.*

James C. Cox, et al., Theory and Behavior in Multiple Unit Discriminative Auctions, The Journal of Finance, vol. 39, No. 4, Sep. 1984, pp. 983–1010.*

Martin Bichler, et al., Winner Determination Algorithms for Electronic Auctions: A Framework Design, http://www.research.ibm.com, 2001.*

Peter R. Wurman, et al., Flexible Double Auctions for Electronic Commerce: Theory and Implementation, Decision Support Systems, vol. 24, 1998, pp. 17–27.*

Motty Perry and Philip J. Reny, On the Failure of the Linkage Principle in Multi–Unit Auctions, Econometrica, vol. 67, No. 4, Jul. 1999, pp. 895–900.*

Charles R. Plott and Jared Smith, Instability of Equilibria in Experimental Markets: Upward–Sloping Demands, Externalities, and Fad–Like Incentives, Southern Economic Journal, vol. 65, Iss. 3, pp. 405–426.*

Paul Alsemgeest, et al., Experimental Comparisons of Auctions Under Single– and Multi–Unit Demand, Economic Inquire, vol. 36, Iss. 1, Jan. 1998, pp. 87–97.*

Jeroen M. Swinkels, Asymptotic Efficiency for Discriminatory Private Value Auctions, Review of Economic Studies, vol. 66, 1999, pp. 509–528.*

Robert A. Feldman and Rajnish Mehra, Auctions: Theory and Applications, IMF Staff Papers, Sep. 1993, Vo. 40, No. 3, pp. 485–511.*

* cited by examiner

| | |
|---|---|
| Make: | eTOWER |
| Model: | 400I |
| Processor: | Intel Celeron 400 MHz |
| RAM: | 32MB |
| Hard Drive: | 4.3G |
| CD ROM: | YES |
| Modem: | 56K V.90 |
| Video Memory: | 4MB |
| Speakers: | YES |
| | |
| Condition: | Unused |
| Warranty: | None |
| | |
| Total Lot Qty: | 100 |
| Reserve Unit Price: | $100 |
| Reserve Price: | $10,000 |
| Bid Increment: | $100 |
| | |
| Min. Sublot Qty: | 10 |
| Parity Unit Price: | $150 |
| Pricing Model: | k = |
| | |
| Auction Start Date/Time: | |
| | |
| Auction Close Date/Time: | |

Fig. 5

| | |
|---|---|
| Make: | eTOWER |
| Model: | 400I |
| Processor: | Intel Celeron 400 MHz |
| RAM: | 32MB |
| Hard Drive: | 4.3G |
| CD ROM: | YES |
| Modem: | 56K V.90 |
| Video Memory: | 4MB |
| Speakers: | YES |
| Condition: | Unused |
| Warranty: | None |
| Total Lot Qty: | 100 |
| Reserve Unit Price: | $100 |
| Reserve Price: | $10,000 |
| Bid Increment: | $100 |
| Min. Sublot Qty: | 10 |
| Max. Parity Price: | $150 |
| Sublot Qty 1: | 75 |
| Reserve Price 1: | $7,875 |
| Reserve Unit Price 1: | $105 |
| Sublot Qty 2: | 50 |
| Reserve Price 2: | $5,500 |
| Reserve Unit Price 2: | $110 |
| Sublot Qty 3: | 25 |
| Reserve Price 3: | $3,125 |
| Reserve Unit Price 3: | $125 |
| Auction Start Date/Time: | |
| Auction Close Date/Time: | |

ON-LINE AUCTION METHOD AND SYSTEM FACILITATING THE SALE OF MULTIPLE PRODUCT UNITS AT PRICES VARYING WITH VOLUME

BACKGROUND OF THE INVENTION

1. Reservation of Copyright.

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Field of the Invention.

The present invention relates to certain types of online auction systems and methods for providing sellers and buyers a mechanism for selling and buying, respectively, products (goods or services) in unit quantities.

3. Description of Background Information.

Auctions are used to sell many types of products (goods and services), including land, commodities, art, food, money, work contracts, computers and automobile parts, to name just a small number. The goal of the seller using an auction process is to obtain the highest value possible in exchange for the good or service. Thus, goods and services are frequently given to the highest bidders so as to provide the seller with the most profit.

Auctions provide sellers access to large quantities of buyers, without the seller having to set a fixed (sometimes arbitrary) price for its goods or services. The auction process can also save sellers time by avoiding negotiating prices individually with buyers.

There are many different types of auction formats. Open auctions give buyers open access to the current bid price, and allow the buyers to proffer a counter-bid when they learn about the most recent highest bid. There are also silent and sealed-bid auctions. Auctions may also be categorized in terms of whether they conform to an ascending price scheme, or whether the price slowly drops until a buyer will come forward and purchase the good or service.

Offline auctions may require buyers and sellers to meet at one or more regionalized or fragmented auction sites. This limits the ease with which buyers and sellers will be able to meet.

Some offline auctions are not so region-limited and allow buyers access to participate in a bidding process through various communication channels. For example, a publication may be widely distributed in the form of electronic or printed media, and bidders may be able to send their bids to a central location, for example, by facsimile mail, e-mail or telephone. Such systems, while centralized, still present certain inefficiencies in making information available to buyers, and in allowing buyers to send in their bids to the central auction facility.

These and other limitations associated with offline auctions can limit the selection of products auctioned, discourage participation, and drive transaction costs up.

In many cases, multiple layers of intermediaries exist between the original seller and the end-buyer.

Online auctions address many of these problems associated with offline auctions. One type of online auction of increasing popularity is the Internet web-based e-auction. Many types of e-auction sites exist, such eBay, Amazon and OnSale. Sites such as these provide centralized trading communities for bringing together buyers and sellers. These systems allow real-time listing, browsing, and bidding through one commonly-accessed system. Such activities may take place from any personal computer having Internet access anywhere throughout the world. Many sites specialize in particular types of seller-buyer trading, e.g., person-to-person (eBay), business-to-consumer (OnSale), or business-to-business (VerticalNet).

Existing e-auction systems have databases which provide both buyers and sellers access to important information needed to analyze trading data and set prices. Access to these databases decreases inefficiencies associated with distributing and obtaining information and thus encourages trading activity.

Online auctions employ many well-known auction methods, including such commonly used business-to-consumer or business-to-business auction formats as the multi-unit ascending auction described by Vickrey (1962) and Ortega-Reichert (1968). The YankeeAuction™ of OnSale.com uses a variation on the format disclosed by these Vickrey and Ortega-Reichert references. The Yankee-Auction model involves a seller auctioning a quantity of identical units. Bidders select the number of units they need and the unit price they are willing to pay. Progressive bidding occurs for a specified period. At the close of the auction, the highest bid prices win at the respective bid quantities. Bids are ranked by unit price, then quantity, and then bid date. Accordingly, with the Yankee Auction, the highest bid wins. In case of ties, larger quantities win. For when the quantity is identical, earlier bids will take precedence.

There are many types of products that sellers would prefer to sell in larger quantities. Thus, the sellers may give a substantial discount to the buyer purchasing a larger volume. This is particularly the case with the used computer market. Every year, global computer dealers sell billions of dollars worth of used computer systems and hardware. FIG. 1 shows a typical supply chain for used computers. The majority of this equipment originates with computer manufacturers 32 (e.g., IBM, Dell, Compaq, Apple, Sun, and Cisco). These computer manufacturers 32 obtain the used computers from their previous owners 30 as lease returns and as trade-ins for upgrades. The computer manufacturers 32 are faced with the logistical challenge and associated cost of warehousing this saleable stock. Accordingly, the manufacturers 32 auction the stock to resellers, comprising wholesalers 34 and dealers 36. Dealers 36 then market the computers to end-users 38.

Manufacturers typically sell their used PCs in enormous fixed-size lots of 1,000–10,000 units, that only a handful of resellers can afford to purchase. The resellers then resell the items in smaller quantities, charging higher prices per unit.

There is a need for a centralized auction system or method which will minimize the transaction costs incurred by the seller and the buyer. The seller will preferably be able to quickly sell large quantities of products directly to buyers of all types while maximizing the total revenues generated from the sales.

4. Definition of Terms.

The following term definitions are provided to help the reader in understanding the terms used herein.

Bid Increment: the incremental amount of money by which a buyer must increase a bid over a competing bid in order to win the bid.

Maximum Parity Unit Price: This is a parity unit price which corresponds to the smallest allowable sublot quantity set by the seller.

Minimum Sublot Quantity: this is the smallest sublot size which a buyer can purchase.

Parity Unit Price: a price falling on the parity unity price curve, which represents the unit price needed to win a given bid as a function of quantity in accordance with a pricing model set by the seller.

Reserve Unit Price (Current Reserve Price): unit price if a buyer purchases the total lot quantity.

Sublot: a portion of a lot.

Total Lot Quantity: the total quantity of units comprising a given lot to be auctioned off by a seller.

Unit: a measure of goods or services being sold through the online auction. An example of a unit is one computer, an hour of professional services, or a dozen golf balls.

Unit Bid Price: the amount of money a buyer bids per unit.

SUMMARY OF THE INVENTION

The present invention is provided to improve upon systems for online auctioning of goods or services. In order to achieve this end, one or more aspects of the present invention may be followed in order to bring about one or more specific objects and advantages, such as those noted below.

An object of the present invention is to allow sellers to sell goods or services in given lot quantities, by breaking up the lot into sublots, while charging a higher unit price for smaller sublots. An object of the present invention is to provide a mechanism by which the sellers can control the manner in which buyers are encouraged to purchase the units in higher volumes, by, e.g., controlling the extent to which higher volumes are discounted.

A further object of the present invention is to provide a mechanism for allowing sellers to set up the parameters of a bid in a simple, time-efficient manner. A further object is to provide a bid/auction mechanism which minimizes the transaction cost incurred by the seller while maximizing the income received by the seller as well as the sales volume (allowing the seller to control costs related to warehousing and stocking products yet to be sold).

The present invention, therefore, may be directed to a method or system, or one or more parts thereof, for facilitating the online interaction between product sellers and buyers. Such a method or system may involve the auctioning of goods or services, such as personal computers, through an online mechanism, such as an Internet website.

In accordance with one aspect of the present invention, an online auction system is provided which comprises a server system, plural buyer systems, and plural seller systems. The server system comprises a seller interface, a buyer interface, a price adjustment mechanism, and a bid manager. The seller interface performs an online bid setup process including obtaining, from a given seller system, price varying information and quantity information corresponding to the price varying information. A buyer interface communicates, to select buyer systems, bid information and product information, and accepts from a given buyer system a given quantity needed, which a given buyer using the given buyer system desires to purchase. It also accepts a given bid from the given buyer system. The product information may comprise the quantity (in units) of goods or services. By way of example, the goods may comprise computer hardware/software systems, such as personal computers with preloaded software.

The bid information may comprise bidding period information, such as auction start date/time and auction end date/time. The given bid is the amount the buyer is willing to pay for the given quantity needed.

The price adjustment mechanism determines a given parity price for the given buyer which varies according to the given quantity needed. The parity price may comprise a unit parity price. A bid manager defines a given winning bid amount for the given buyer as a function of the given parity price and a rank of the given buyer in relation to other buyers.

The bid manager may comprise a mechanism for quoting as the winning bid amount the given parity price when the given quantity needed is greater than a current high bid quantity. The current high bid quantity may comprise the current highest quantity bid at a parity price for that quantity. The bid manager may further comprise a mechanism for quoting as the winning bid amount a value equal to the given parity price plus a bid increment when a sum of the given quantity needed and the current high bid quantity is greater than the total remaining quantity for sale.

BRIEF DESCRIPTION OF THE DRAWINGS

The above and other objects, features, and advantages of the present invention are further described in the detailed description which follows, with reference to the drawings by way of non-limiting exemplary embodiments of the invention, wherein like reference numerals represent similar parts of the present invention throughout the several views and wherein:

FIG. 4 depicts a second embodiment of a seller screen;

FIG. 5 depicts a third embodiment of a seller screen;

DETAILED DESCRIPTION

Figure 1:
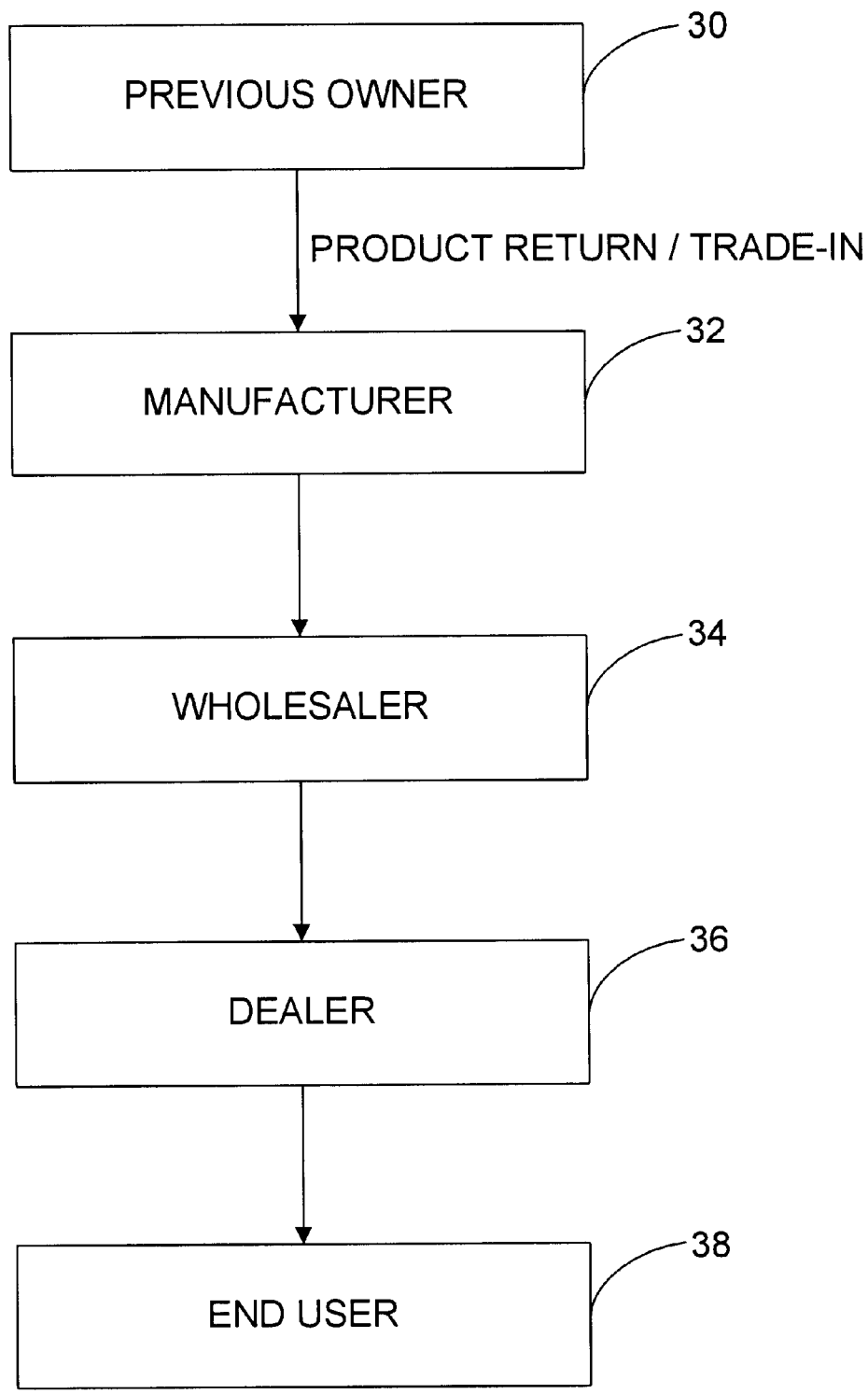
FIG. 1 is a background art depiction of a typical supply chain.
Figure 2:
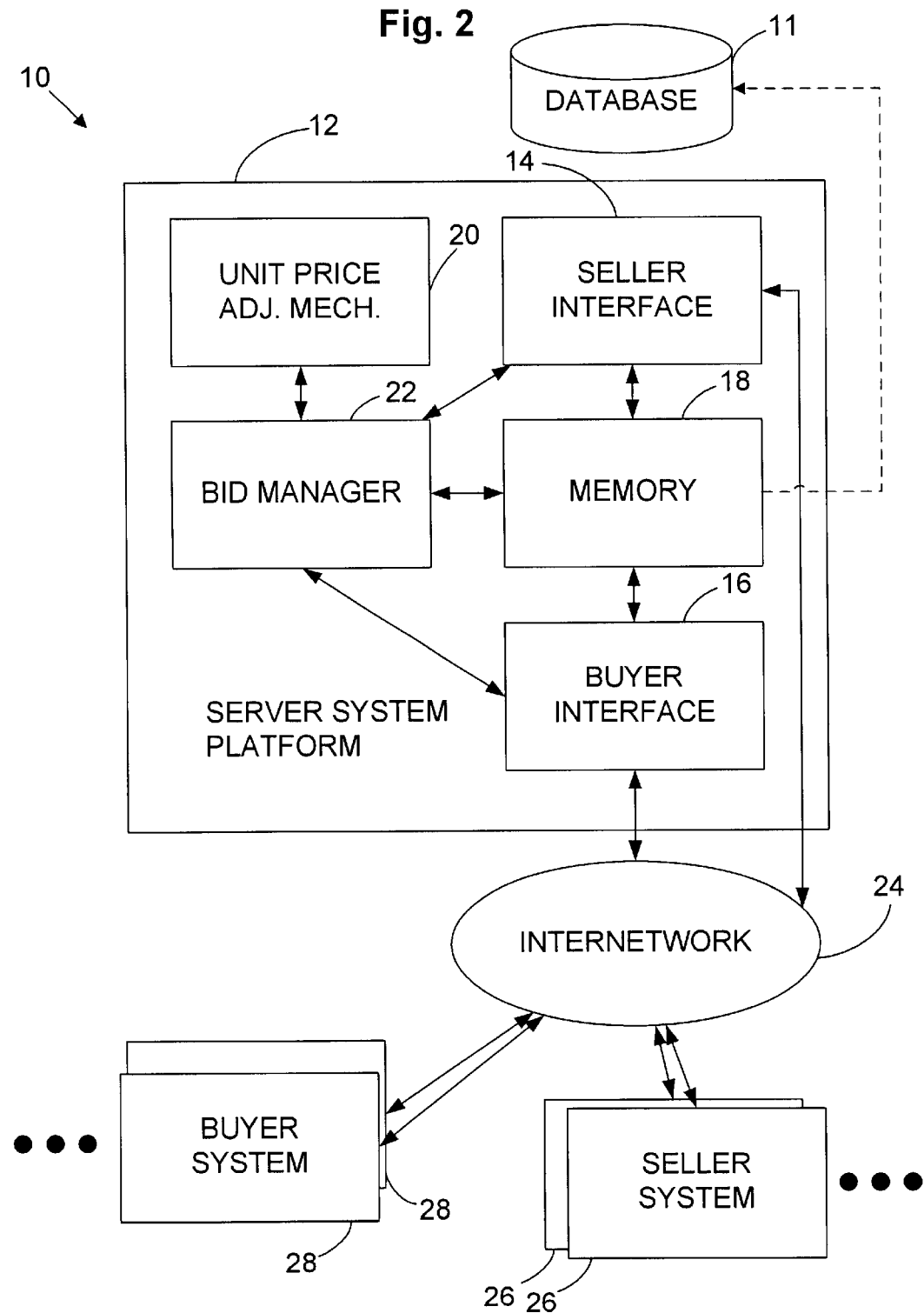
FIG. 2 is a system diagram of one embodiment of an online bidding system.

Referring now to the drawings in greater detail, FIG. 2 depicts an online bidding system 10 in accordance with one illustrated embodiment of the present invention. The illustrated online bidding system 10 comprises a server system platform 12 coupled to a database 11. Server system platform 12 comprises a unit price adjustment mechanism 20, a bid manager 22, a seller interface 14, a memory 18, and a buyer interface 16. Unit price adjustment mechanism 20 is coupled to bid manager 22. Each of bid manager 22, seller interface 14, and buyer interface 16 is coupled to bid manager 22. Memory 18 is coupled to database 11. Buyer interface 16 is coupled an internetwork 24, which, in the illustrated embodiment, comprises one or a combination of the Internet, a LAN (Local Area Network), and a WAN (World Area Network). Through internetwork 24, buyer interface 16 is coupled to a plurality of buyer systems 28.

Seller interface 14 is coupled to inter-network 24, and through internetwork 24, it is coupled to a plurality of seller systems 26. In the illustrated embodiment, each of buyer systems 28 and seller systems 26 comprises a web client, while each of buyer interface 16 and seller interface 14 comprises, among other elements, a web server component which is compatible with the web clients. For example, the technology that is utilized may be consistent with Internet Explorer or NetScape web technology.

Bid manager 22 manages the overall bidding process, and coordinates the operation of seller interface 14, buyer interface 16, and unit price adjustment mechanism 20. Seller interface 14 comprises a process which handles the interaction between server system platform 12 and seller systems 26. Buyer interface 16 handles the interaction between server system platform 12 and buyer systems 28. Unit price adjustment mechanism 20 performs calculations to determine a unit price used to determine a price required to win a bid for a given bid quantity.

Server system platform 12 may comprise one or a plurality of computers, and each of the components forming part of server system platform 12, i.e., bid manager 22, unit price adjustment mechanism 20, seller interface 14, memory 18, and buyer interface 16 (and others not specifically shown—e.g., operating system components, applications, or other software that may also be running on the platform), may comprise processes operating within an operating system on the platform. The operating system may be a single operating system or distributed operating system.

Each of buyer systems 28 and seller systems 26 may comprise, for example, individual personal computers coupled to internetwork 24 via a dial up connection, through an internet service provider, or through a LAN or WAN connection to the Internet. In the illustrated embodiment, buyer systems 28 and seller systems 26 comprise web browsers, which communicate with server system platform 12.

Seller interface 14 performs an online bid setup process which includes obtaining, from a given seller system 26, price varying information and quantity information corresponding to the price varying information. Buyer interface 16 communicates to select buyer systems 28 bid information and product information. The product information may comprise information describing goods or services. In the embodiment specifically illustrated herein, the product is goods, which comprise second-hand/ previously owned personal computer systems. The bid information comprises bidding period information, specifically including an auction start date/time and an auction end date/time in the embodiment provided herein. The buyer interface also accepts from the given buyer system 28 a given quantity needed, which a given buyer using the given buyer system desires to purchase, and a given bid. The given bid is the amount the buyer is willing to pay for the given quantity needed. If this bid is sufficiently high to be a winning bid, the transaction will take place, either obligating the buyer to purchase the product (and the seller to sell the product) for the specified terms, or, depending upon the implementation, actually effecting an electronic payment for the product and setting in place a product delivery process.

Unit price adjustment mechanism 20 determines a given unit parity price for the given buyer, which unit parity price varies according to the given quantity needed by the given buyer. Bid manager 22 defines a given winning bid amount for the given buyer as a function of the given unit parity price and a rank of the given buyer in relation to other buyers.

Figure 3:
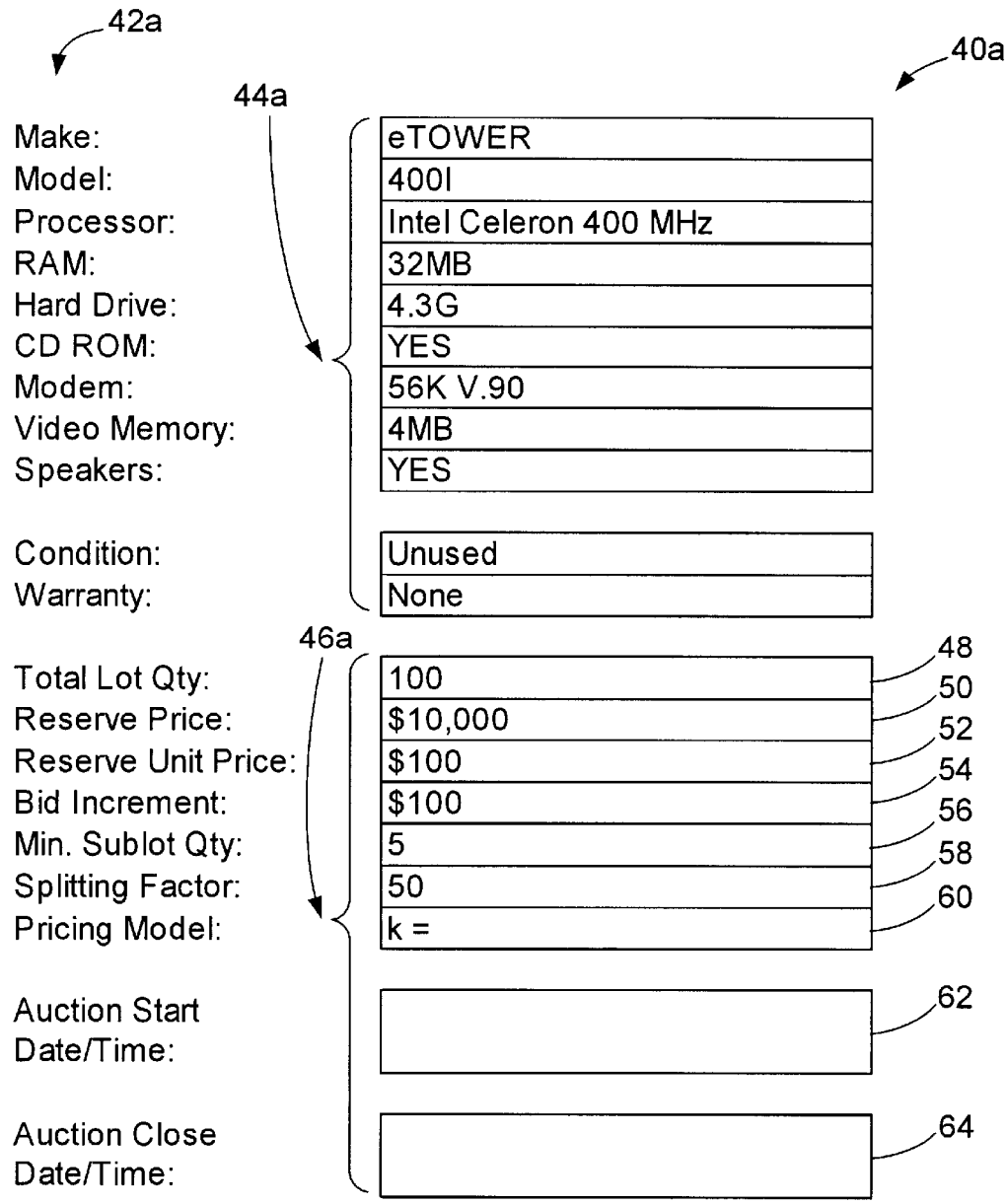
FIG. 3 depicts a first embodiment of a seller screen.

FIGS. 3, 4, and 5 depict, respectively, first, second, and third embodiments of seller screens which may be displayed on a given seller system 26 per operation of seller interface 14. Referring to FIG. 3, a seller screen 40a is shown, comprising a column of legends 42a, with corresponding records next to each respective legend.

Specifically, a set of unit description records 44a is provided which describes a unit of a given product. In this embodiment, certain characteristics of a type of personal computer being sold are described in various records 44a. The products being sold may be identical. That is, each unit may comprise a product which has certain identical characteristics to all other units within the lot. Alternatively, a given unit may be considered a unit because it meets certain requirements. Minor variations may not preclude a product from being considered a unit from the same lot, so long as they meet the describing characteristics set forth in the unit description section of the seller screen.

Bid parameters 46a are also set forth in first seller screen 40a. They comprise a total lot quantity 40a, a reserve price 50, a reserve unit price 52, a bid increment 54, a minimum sublot quantity 56, a splitting factor 58, a pricing model value k 60, an auction start date/time 62, and an auction close date/time 64.

The embodiment shown in FIG. 3 corresponds to a seller interface process by which a seller can apply a pre-defined unit cost increase to the current price of a particular sublot quantity in a multi-unit ascending auction. This embodiment enables a seller to specify his or her willingness to split an auction lot, and to identify the added transaction cost associated with such a split. These costs are then passed along to the buyer in the form of a unit cost increase as compared with the unit cost of purchasing the entire lot.

The seller interface may be provided with a mechanism (not specifically shown) for allowing the seller to register prior to being cleared to trade using the e-auction site. Registration may involve inputting a standard set of personal and business information through an online form (not shown). Such data may be maintained in a system database 11 as shown in FIG. 2, and used, as necessary, for such things as security, billing, and marketing purposes. Once a user/seller is registered, he or she may act as a seller and list items for auction. In order to do so, a mechanism may be provided which requires the seller to specify auction parameters by filling out an online form such as that shown in FIG. 3. Unit description information 44a is input, and bid parameters 46a are input as well by the seller. Total lot quantity 48 will comprise a value representing the total quantity of product for sale. In this case, 100 computers are being offered for sale by the seller. Reserve price 50 comprises a value representing the minimum (opening) bid for the purchase of the entire lot. In this example, the purchase price for the entire lot is $10,000. The reserve unit price 52 corresponds to a calculated value which is not directly input by the user. This value is calculated by dividing the reserve price by the total lot quantity. In this case, this value is equal to $100. The bid increment 54 is input by the seller, and represents the minimum by which a successive bid must top a current high bid.

A minimum sublot quantity 56 is input by the seller, and specifies the minimum sublot quantity that can be purchased by a given buyer. A splitting factor, which is 50 in the example, is specified by the seller which determines the unit price increase that is applied to split lots to offset added transaction costs. More information will be provided below regarding the significance of the splitting factor and how it may be used in the bidding process. A pricing model parameter (k) 60 is also specified. In addition, the seller will indicate parameters defining the bidding period in the illustrated embodiment. Those parameters comprise an auction start date/time 62 and an auction close date/time 64.

The splitting factor is a seller-defined parameter used with a pricing algorithm to quantify the unit cost increase to be applied to split lots. For example, FIG. 3 illustrates a first embodiment seller screen in which a seller has determined that the price of splitting a lot into sublot quantities and selling in such sublots (rather than selling the whole lot) is $50.00 per split. This factor is easily converted to a maximum parity unit price (P). The maximum parity unit price is the parity unit price for the purchase of the minimum sublot quantity. It is by definition higher than the reserve unit price, which is the price that is paid for buying the complete lot. Both of these values may be utilized to calculate a parity unit price curve in accordance with a given algorithm. Various embodiments are depicted below for implementing such an algorithm. Such calculations are performed, in the illustrated embodiment, by the unit price adjustment mechanism 20 of the online bidding system 10 showing FIG. 2.

FIG. 4 shows a second embodiment of a seller screen, where the seller does not need to specify the splitting factor. Rather, the seller identifies the minimum unit price for both the total quantity and the minimum sublot quantity. The illustrated second seller screen 40b comprises, as was the case with the screen showing FIG. 3, a column of legends 42b, and corresponding records, including unit description records 44b and bid parameters 46b.

In the embodiment shown in FIG. 4, the seller does not need to specify the splitting factor or pricing algorithm used to determine the sublot unit price. Rather, the seller specifies the reserve unit price to start the bidding for each available sublot quantity. As with the preceding approach, the reserve unit price will increase as the sublot quantity decreases. This method allows a seller to run several simultaneous independent auctions for different sublot quantities. The specified reserve unit price must be bid for a sublot quantity in order to open the bidding for that quantity.

FIG. 5 shows a third embodiment of a seller screen 40c, which comprises a column of legends 42c, with corresponding unit description information 44c and bid parameters 46c. This embodiment utilizes a larger selection of bid parameters 46c.

FIG. 5 requires that additional information be provided by the seller as compared with the embodiments illustrated in FIGS. 3 and 4. That information includes such information as the total lot quantity, reserve price, reserve unit price, bid increment, the minimum sublot quantity, and the maximum parity price corresponding to the minimum sublot quantity. In addition, the seller may input a plurality of sublot quantity sizes and corresponding reserve unit prices. In the embodiment illustrated in FIG. 5, up to 3 sublot quantities may be input in addition to the minimum sublot quantity. In addition, the seller can indicate the bidding period by specifying an auction start date/time and auction close date/time.

The bid manager 22 will compare different bids for different sublot quantities in order to rank the bids and to determine the winner. Utilizing the database 11, bid manager 22 will compare high bids for each sublot quantity versus the reserve unit price specified for that quantity. For instance, if buyer no. 1 offers to purchase the entire lot of 100 units for the initial reserve unit price of $100.00, while buyer no. 2 offers to buy 25 units at $150.00 per unit (120% of the initial reserve unit price), then the buyer no. 2 will win the bid. In order for buyer no. 1 to counter the bid of buyer no. 2, he or she must bid an equivalent of 120% of the reserve unit price for that particular quantity (100 units), i.e., $120.00 per unit. If buyer no. 1 achieves price parity (120%) with buyer no. 2, buyer no. 1 would win the bid since bids are ranked by price, then quantity, and then date.

Figure 6:
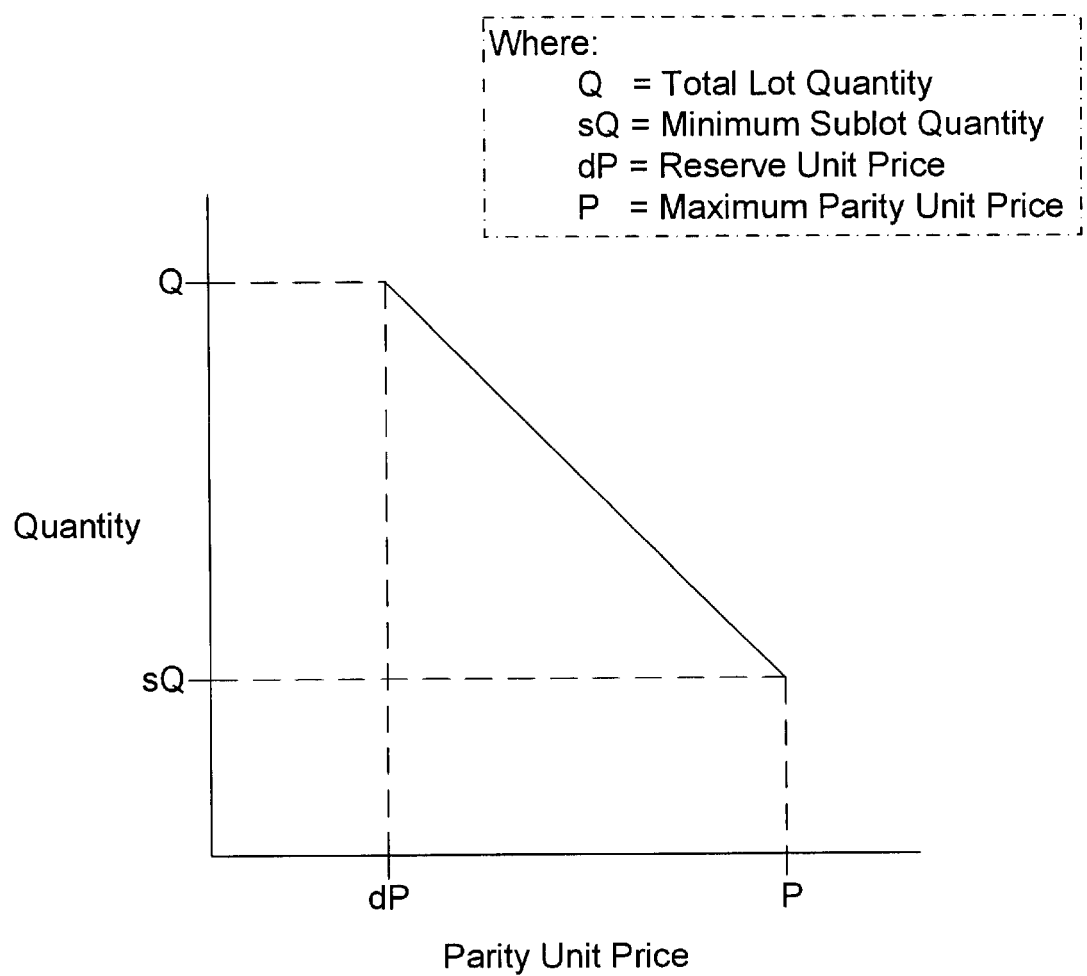
FIG. 6 is a graph of unit price versus quantity, where the unit price varies linearly with quantity.

The unit parity price curve may be defined in any manner so as to allow the varying of the price as a function of the quantity purchased by the buyer. FIG. 6 provides one example of a parity unit price curve depicting the manner in which the parity unit price will vary in relation to the quantity needed by the buyer. In FIG. 6, the parity unit price varies linearly with respect to the quantity. Specifically, the parity unit price can be as low as the reserve unit price dP, which is the price for purchasing the entire lot quantity Q, to as high as the maximum parity unit price P which is the price for purchasing the minimum sublot quantity sQ.

The unit price adjustment mechanism 20 may be implemented to determine whether a given sublot quantity dictates a particular parity unit price in accordance with the curve shown in FIG. 6. Various values defining the curve shown in FIG. 6 may be specified by the seller or may be calculated using a particular equation which receives certain parameters, dictated by the seller (through a seller screen) or set as default parameters. In this embodiment, the total lot quantity Q, the minimum sublot quantity sQ, and the reserve unit price dP are all determined directly by the seller. The maximum parity unit price P is determined by a calculation involving the splitting factor chosen by the seller. The maximum parity unit price P is determined using the following equation:

$$P = dP + f\left(\frac{Q - sQ}{QsQ}\right)$$

The value f represents the splitting factor.

This calculation is required for the seller interface depicted in FIG. 3. In FIG. 4, the seller may directly specify the maximum parity unit price P. In any event, a linear pricing model may be utilized based upon the reserve unit price, the maximum parity unit price, the total quantity, and minimum sublot quantity, where the unit price increases at a constant rate as the sublot quantity decreases.

Given the two endpoints of the linear pricing model (dP, Q) (P, sQ), an infinite number of polynomial curves can also be created that pass through these points. The family of polynomial curves passing through the two points, in the embodiments illustrated herein, may be determined using the following equation, solved for the bid unit price (p) given a sublot quantity (q):

$$p = (P - dP)\left(1 - \left(\frac{q - sQ}{q - sQ}\right)\right)^k + dP$$

Figure 7:
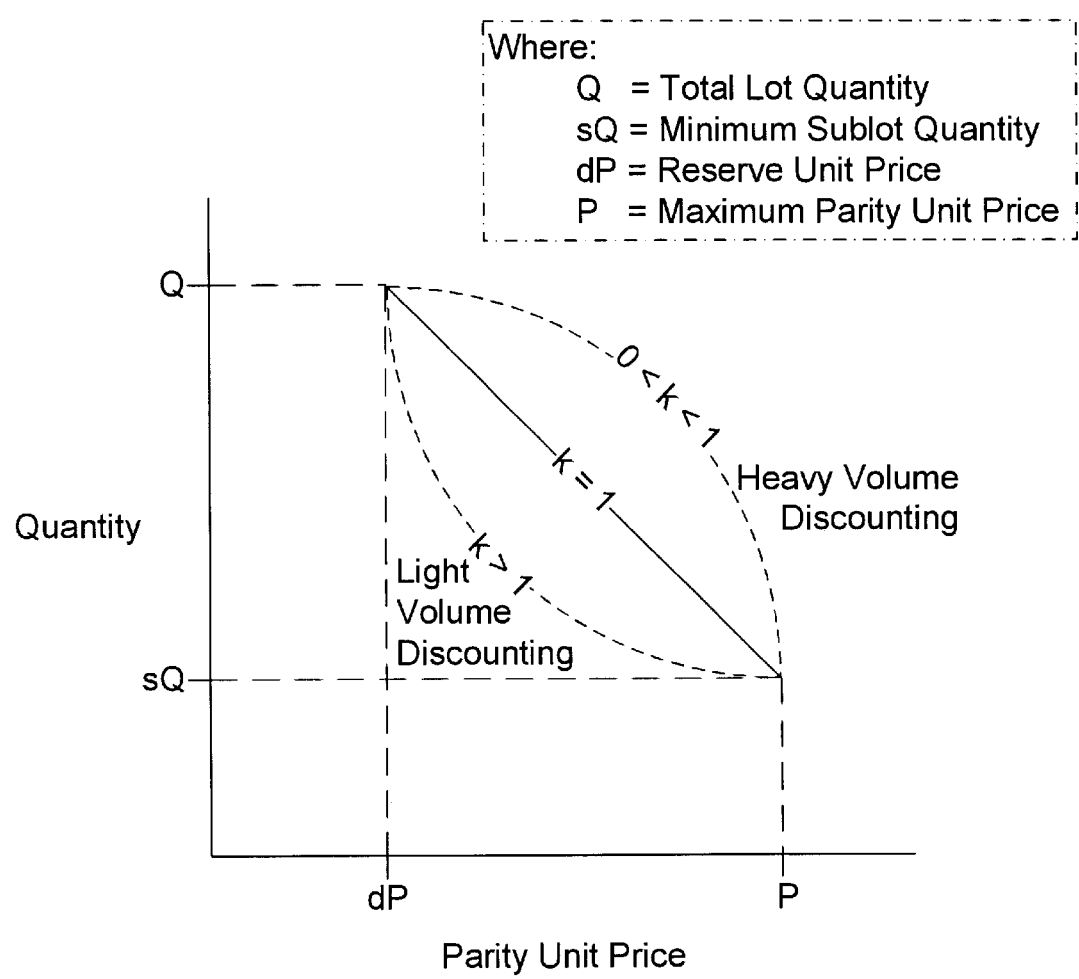
FIG. 7 is a graph of unit price versus quantity, where the quantity-unit price curve varies depending upon the price model specified by the seller.

In this equation, k is a factor associated with the specified pricing model which may be selected by the seller, as shown in FIG. 7. According to this equation, if k=1, the curve generated is the original straight line with a constant unit price increase versus quantity. However, if k is greater than 1, the equation generates a polynomial curve that dips below the line. This pricing equation may be chosen by a seller who is willing to split the lot to a particular size for a modest increase over the reserve unit price. On the other hand, if the value of k is between 0 and 1, the equation generates a polynomial curve that rises above the line. This curve may be chosen by a seller who, although willing to split the lot, requires a more significant price increase paid by the buyer for sublot quantities.

In another embodiment, the pricing curve between the two points (sQ, P) and (Q, dP) can be determined by a combined exponential equation of the form:

$$p = Pe^{-k(q-sQ)} + e^{\frac{\log(dP + 1 - Pe^{k(Q-sQ)})}{Q-sQ}(q-sQ)} - 1$$

where k is a factor associated with the specific pricing model selected by the seller. Note that this equation yields the same result as the polynomial equation, but uses exponential nomenclature instead.

In yet another embodiment, the pricing curve can be calculated according to a generalized Leontiev equation of the form:

$$p(q-sQ) = \left[K - \frac{K\left(1-\frac{dP}{P}\right) - d\sqrt{(Q-sQ)dP}}{Q-sQ}(q-sQ) - \frac{K}{P}p\right]^2$$

where K and d are pricing factors associated with the specific pricing model selected by the seller. And the unit price (p) associated with a sublot quantity (q) can be determined by using the quadratic equation of the form:

$$p = \frac{-b \pm \sqrt{b^2 - 4ac}}{2a} \text{ given the fact that, } ap^2 + bp + c = 0$$

Note that the generalized Leontiev equation yields the same result as the polynomial equation and combined exponential equation, but uses a complex quadratic nomenclature instead.

Figure 8:
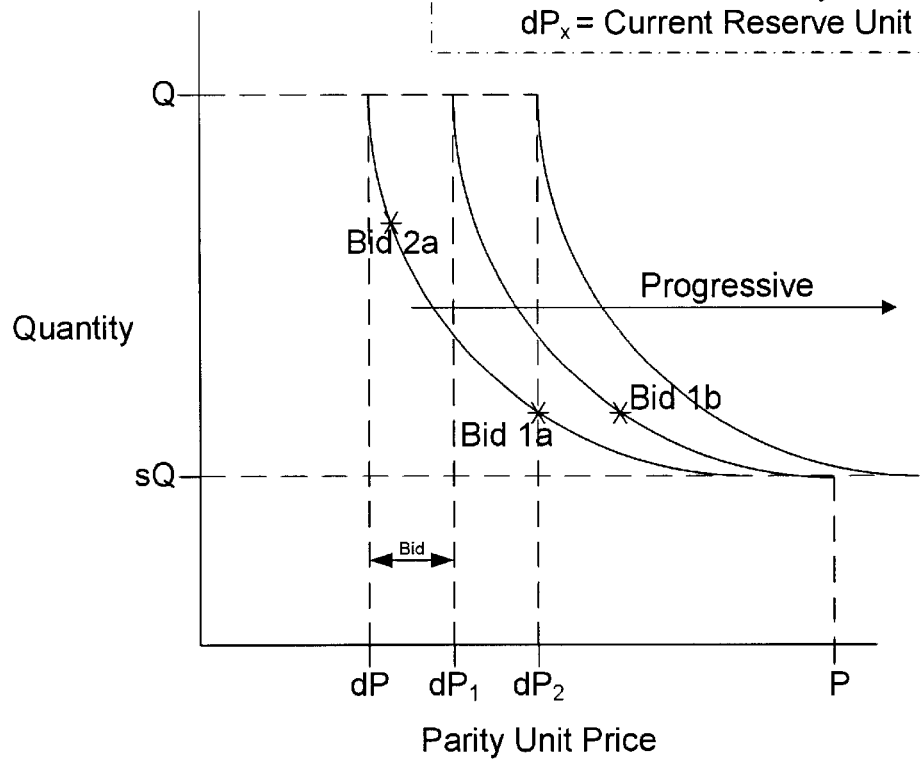
FIG. 8 is a graph of unit price versus quantity, illustrating a given curve which moves to increase the unit price in accordance with progressive bidding.

FIG. 8 illustrates a plurality of parity unit price curves in order to illustrate a process of progressive bidding and the manner in which the bidding manager can-rank bids by price, then quantity, and then by bid time. The bidding manager will assume that there is parity between bids for different quantities that fall on the same parity unit price curve. Thus, all bids which reside along the pricing curve are treated as equivalent for price (i.e., bid 1a and 2a), and will be won or lost based upon higher quantity (i.e., bid 2a wins). For the buyer of a smaller sublot quantity to make a winning bid, he or she must bid off the curve to the right or at a higher unit price (i.e., bid 1b now wins over 2a). The effect of doing this is to progressively move the entire-parity unit price curve to the right as the bidding progresses. Thus, while the shape of the parity unit price curve does not change, the bid unit price for all quantities increases as the auction progresses.

Figure 9:
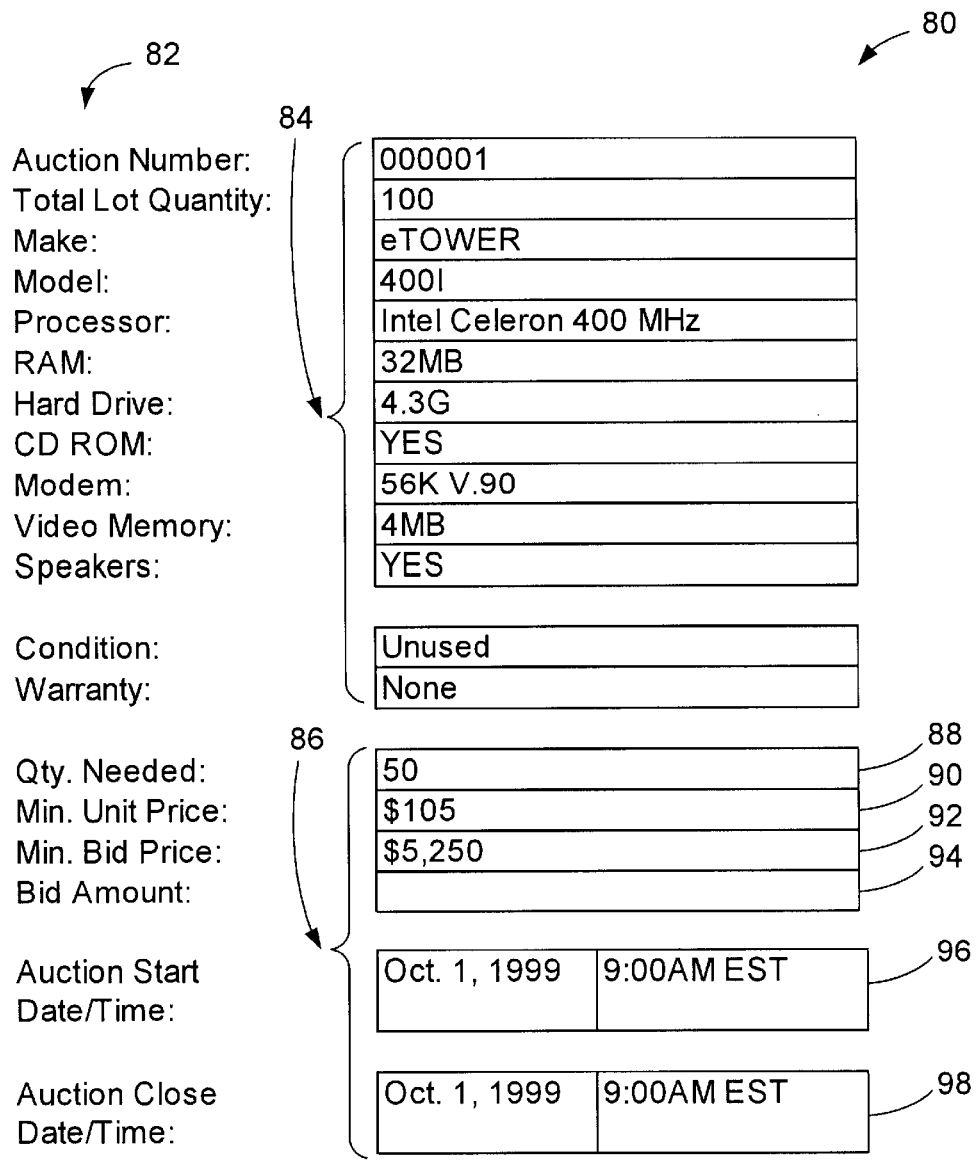
FIG. 9 illustrates an embodiment of a buyer screen.

FIG. 9 illustrates one example embodiment of a buyer screen 80. A column of legends 82 is provided, and records are provided to the right of the corresponding legends, including unit description information records 84 and bid information records 86. The bid information records 86 comprise a quantity needed value 88, a minimum unit price value 90, a minimum bid price 92, a bid amount 94, and auction start and auction close values 96 and 98. The quantity needed value 88, in the illustrated example, comprises 50 units. The minimum unit price for this quantity is $105, and the minimum bid price for this total quantity is $5,250. The minimum unit price value of $105 represents the minimum unit price needed to win the bid. The actual amount that is bid by the buyer may be input in the space for the bid amount 94.

Once an auction has been launched by a seller, it will be visible to potential buyers browsing the auction cite. Through the buyer interface, a summary, or detailed listing, of the auction parameters may be presented, for example, in tabular form. FIG. 9 is one example of a buyer screen which can be reached once the buyer chooses a particular auction. With that screen, the buyer needs only to identify the quantity needed. Based upon seller's specifications, the remaining values of the minimum unit price and minimum bid price may be computed. The price that is provided as the minimum unit price is the minimum price that must be bid in order to win the bid, and that value is calculated by bid manager 22 taking into account unit parity price information from unit price adjustment mechanism 20, as described previously herein. Accordingly, the winning minimum bid price may be calculated from a pricing curve selected by the seller for that auction. Thus, e.g., if a buyer wishes to buy only 5 units, he or she may be quoted a reserve unit price of $105 rather than $100 per unit for which he could pay to purchase all 100 units.

Figure 10:
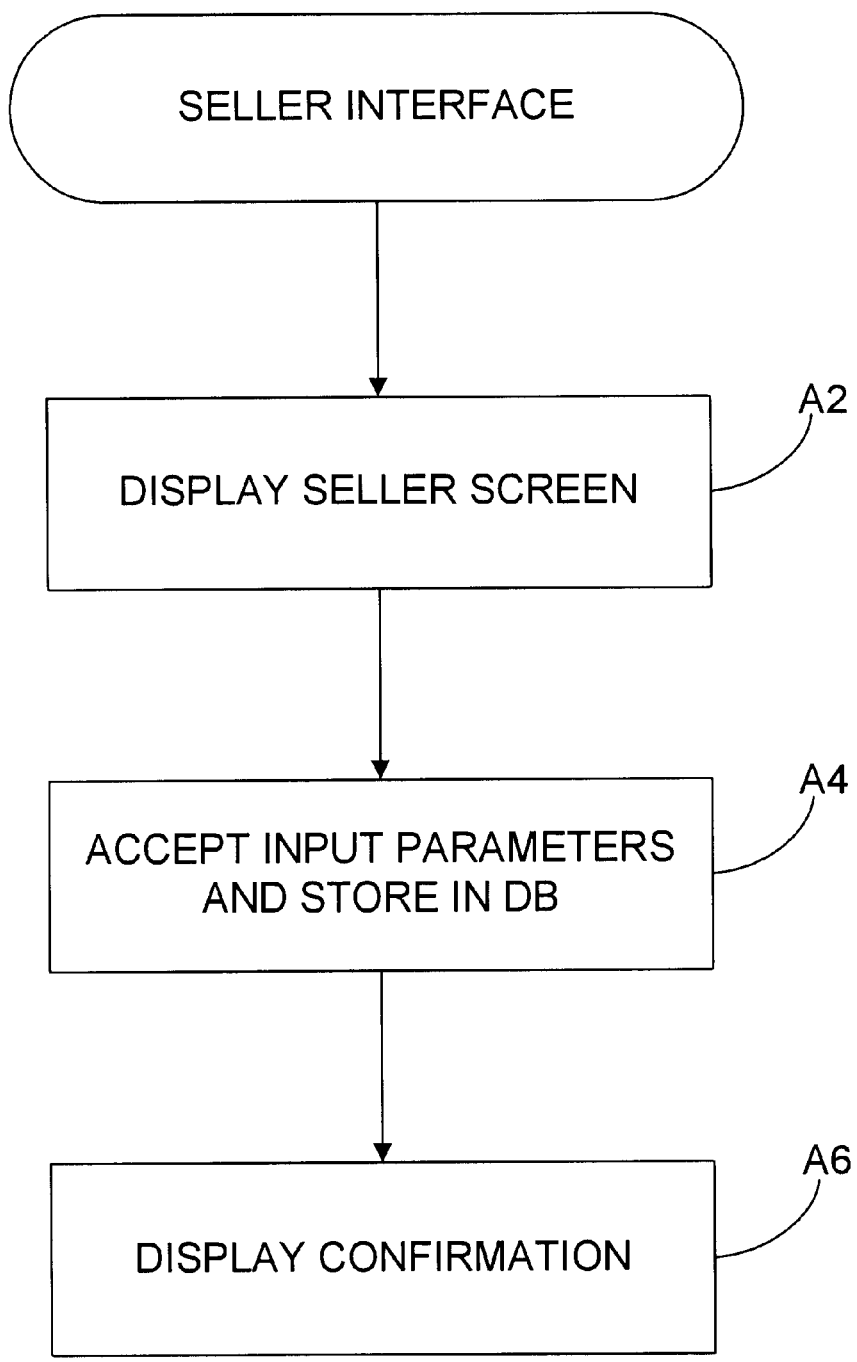
FIG. 10 depicts a flowchart of a seller interface process in accordance with the illustrated embodiment.

FIG. 10 illustrates a general process performed by seller interface 14. In a first act A2, the seller screen is displayed. In a next act A4, input parameters are accepted by the seller interface. That is, certain input parameters may be input by a seller using a seller system 26. They are received by seller interface 14, accepted, and stored within memory 18 and then stored within database 11.

In a next act A6, a confirmation display is provided to the seller via seller system 26. Accordingly, if, for example, the first seller screen 40a shown in FIG. 3 is presented to a seller, it will be displayed at act A2. The seller can input various parameters at the bid parameters 46a record location on the screen. That is, the seller can input the total lot quantity, which is 100 in the screen shown in FIG. 3. The reserve price $10,000 can be input. The seller interface may then calculate, from the first two values, the reserve unit price of $100. The seller can input the bid increment of $100 at the bid increment location 54. The minimum sublot quantity, splitting factor, and pricing model are also input by the seller. In addition, the seller inputs values for the auction start and auction close date/times. A confirmation is then provided at act A6 of the fact that all of these values have been accepted by the system.

Figure 11A:
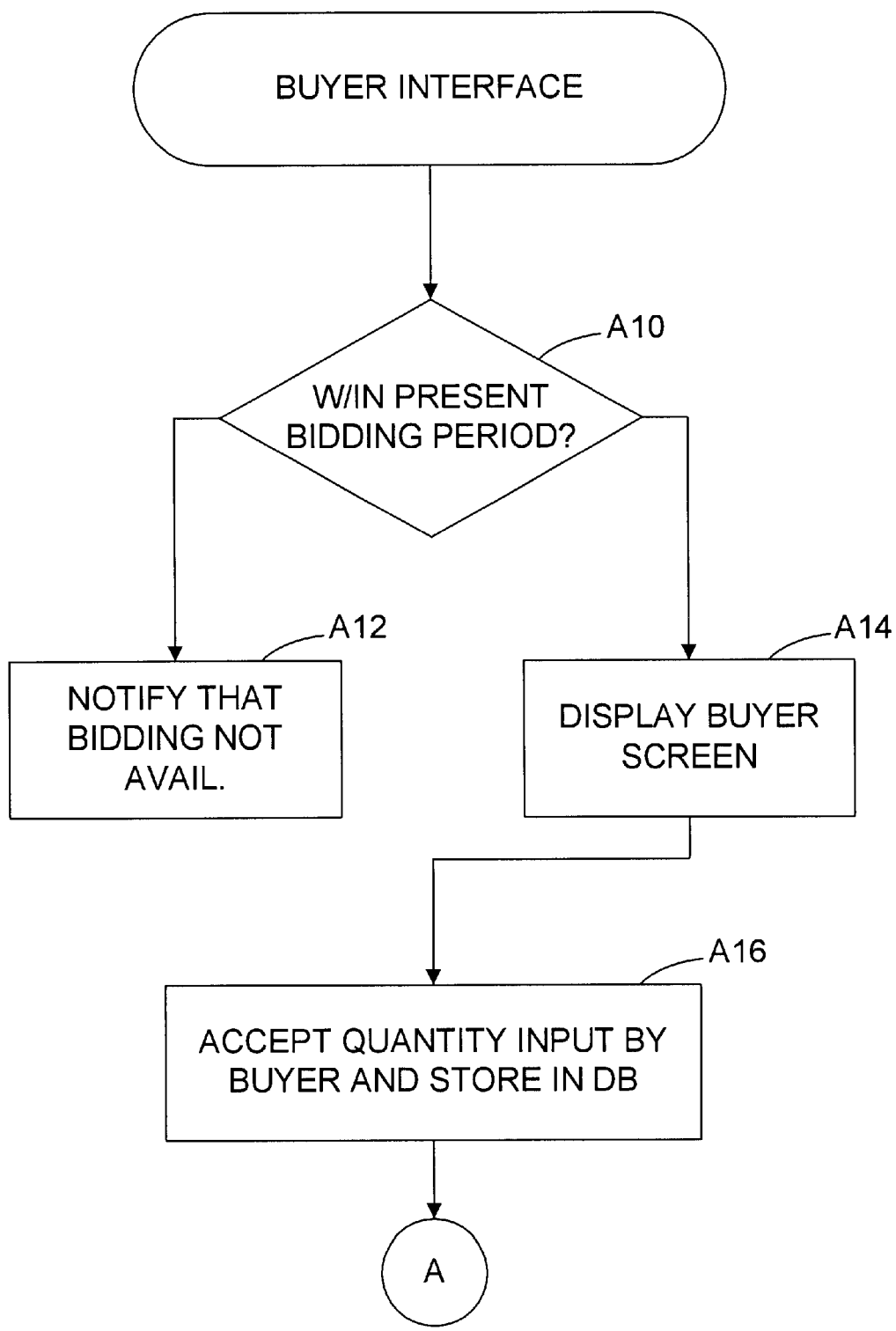
FIGS. 11A–11C depict a flowchart of a buyer interface process in accordance with the illustrated embodiment.
Figure 11B:
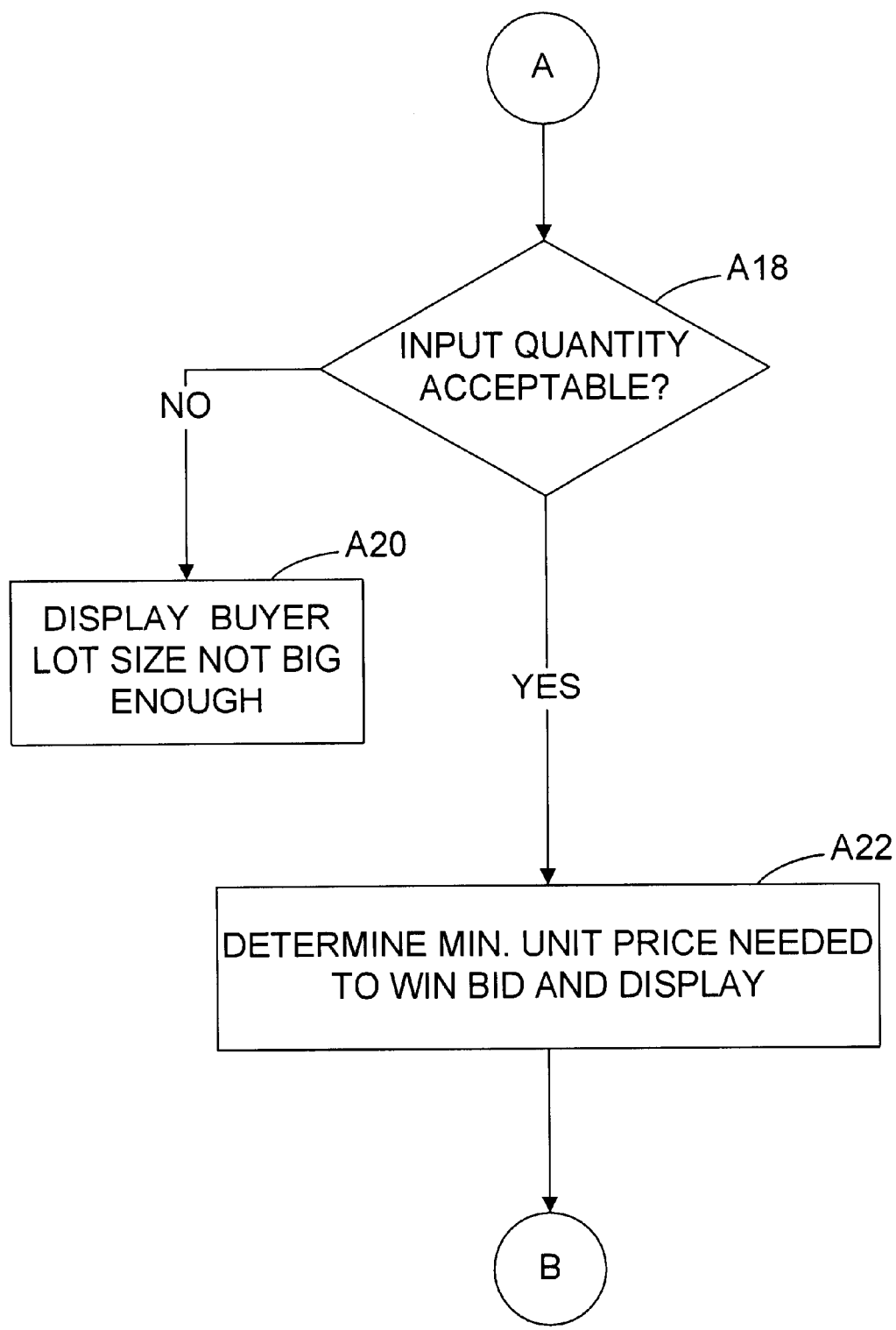
Figure 11C:
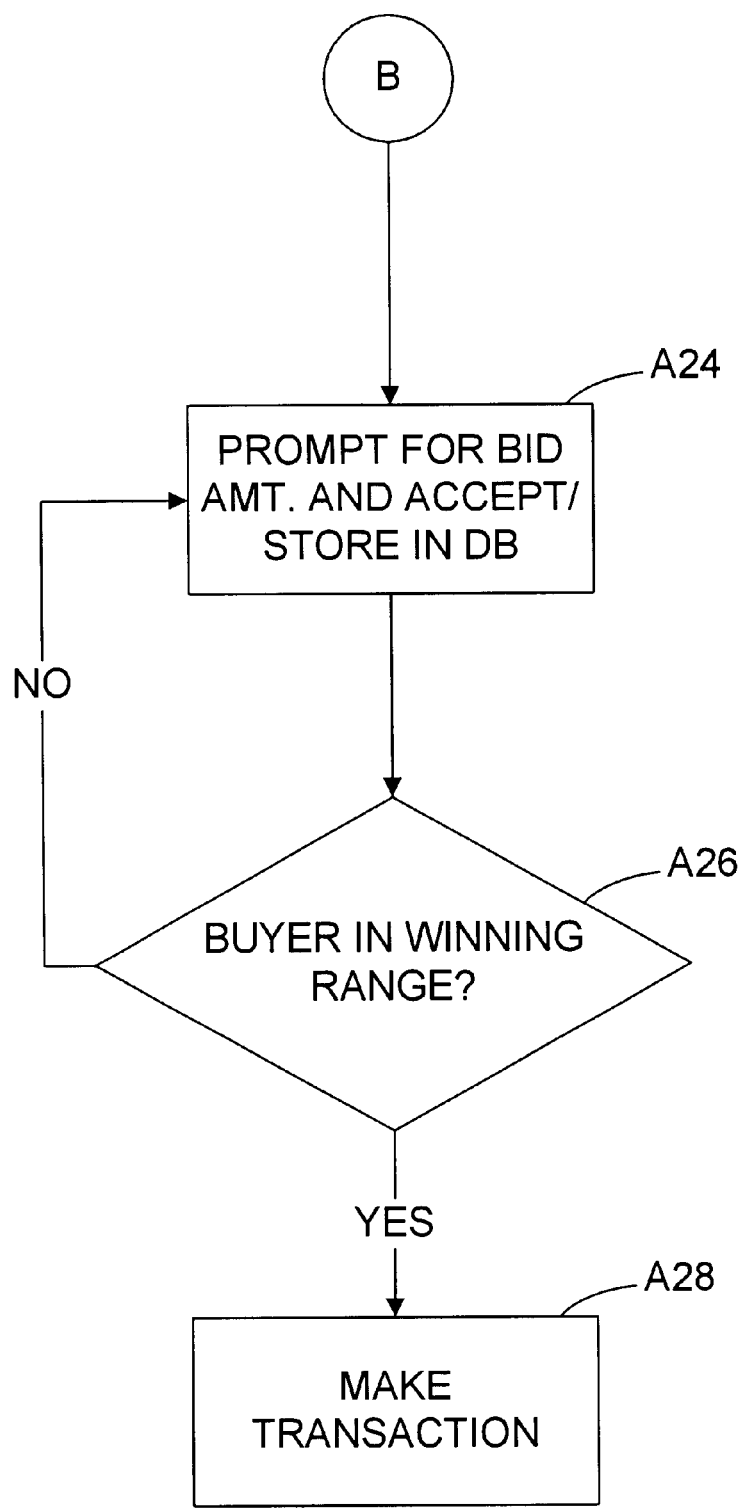

FIGS. 11A–11C comprise a flowchart illustrating the general process performed by a buyer interface, such as buyer interface 16 shown in FIG. 2. In a first act A10, a determination is made as to whether the buyer is interacting with the system during a present bidding period. If the buyer is not within the present bidding, which is defined by the auction start and auction close date/times in the illustrated embodiment, the process will proceed to act A12, at which point in time the buyer will be notified through buyer system 28 that bidding is not available for that particular auction. If the buyer is trying to interact during an existing and valid bidding period as determined at act A10, the process will proceed to act A14. In act A14, the buyer-screen will be displayed. At act A16, the needed quantity, input by the buyer through buyer system 28, will be accepted by buyer interface 16 and stored within database 11. In a next act A18, a determination is made as to whether the input quantity needed is acceptable. In other words, a determination is made as to whether the quantity needed is greater than or equal to the minimum sublot quantity specified by the seller. If the quantity is not acceptable, a display is provided to the buyer at act A20 indicating that the lot size is not large enough. The process will proceed from act A18 to act A22, where the buyer interface will trigger the determination of the minimum unit price needed to win the bid, and that minimum unit price value will be displayed. At act A24, the buyer will prompted to input a bid amount, and the buyer interface will accept and store that value in database 11. A determination is then made at act A26 as to whether the bid amount is equal to or larger than the minimum amount to win the bid, as was determined at act A22. If not, the process will return to act A24 and prompt the buyer to input a new bid amount. If the buyer does input a bid amount within a winning range, as determined at act A26, the process will proceed to act A28, where the buyer-seller transaction will take place, for example, using point of sale and online account debting techniques.

Figure 12:
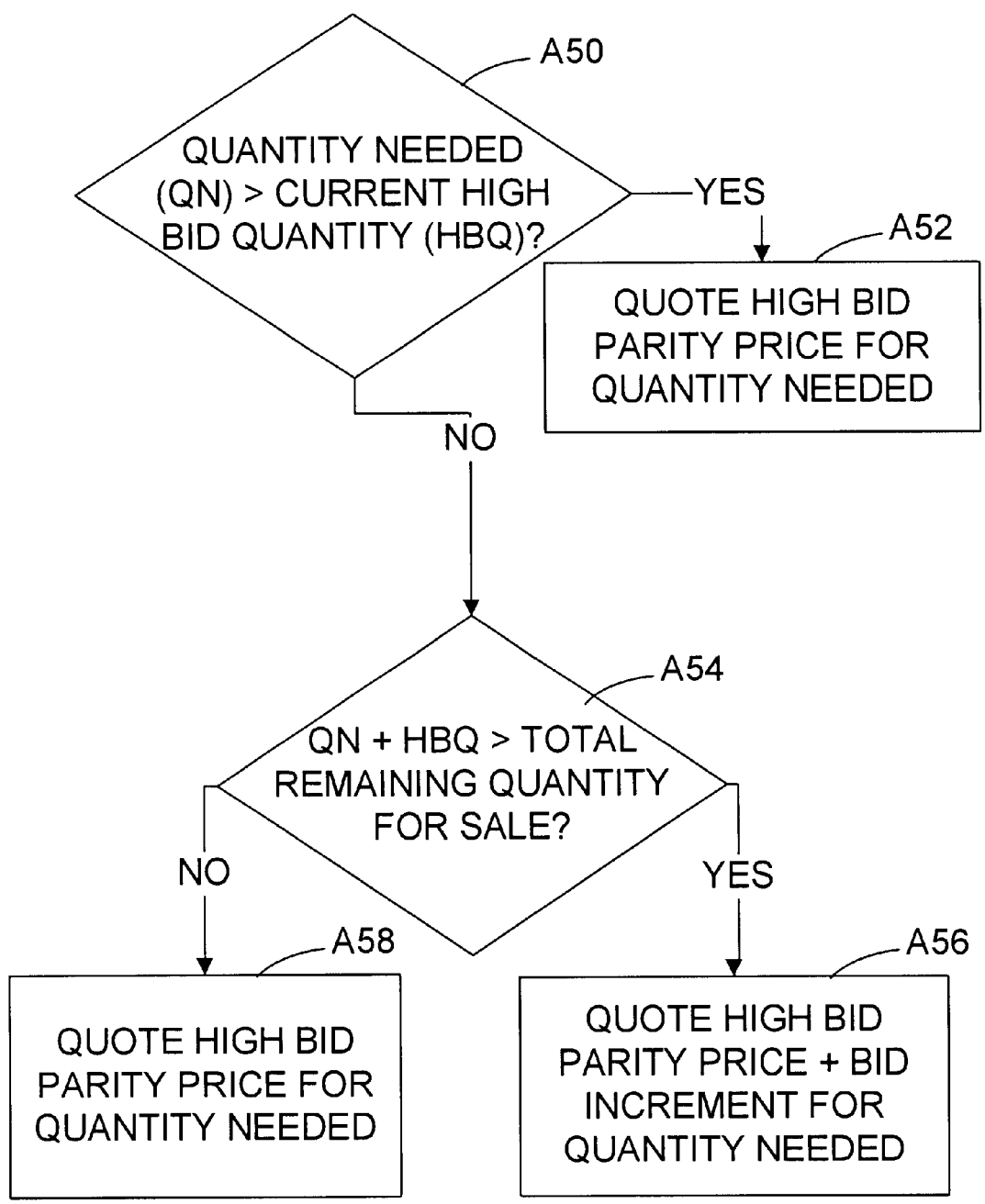
FIG. 12 depicts a flowchart of a process for defining the price to win a bid on a given needed quantity.

FIG. 12 provides a flowchart of the process which may be performed by bid manager 22 in order to determine the minimum bid price needed to win a bid. At an initial act A50, a determination is made as to whether the quantity needed, which is input by the buyer, is greater than the current high bid quantity, i.e., the current highest quantity bid at a parity price for that quantity. If the determination results in a yes, the process proceeds to act A52, where buyer interface 16 will input as the minimum unit price the high bid parity price for that quantity needed. If the quantity needed value is determined not to be higher than the current high bid quantity at act A50, the process proceeds to act A54. At act A54, a determination is made as to whether the sum of the quantity needed and the high bid quantity is greater than the remaining quantity for sale. If this relationship holds true, the process proceeds to act A56, where the minimum unit price that will be displayed is the sum of the high bid parity price and the bid increment for the quantity needed. If the relationship checked at act A54 is determined not to be true, the process will proceed to act A58, at which the high bid parity price will be quoted for the quantity needed.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structures, materials, and embodiments, it understood that the invention is not limited to the particulars disclosed. The invention extends to all equivalent structures, mechanisms, acts, and uses, such as are within the scope of the appended claims.

What is claimed is:

1. A networked computer system for auctioning products on-line, comprising:
    a seller interface to perform an auction set up process including obtaining from a seller information comprising a number of units of products to be auctioned, and price varying information that defines at least a price-quantity curve for the products;
    a buyer interface to accept one or more requested quantities from one or more buyer systems coupled to the system; and
    a mechanism coupled to the seller interface and to the buyer interface and configured to determine, based on at least the price-quantity curve and the requested quantities, one or more minimum bid amounts for the requested quantities;
    wherein the mechanism is configured to compare a requested quantity to a current high bid quantity and to quote a minimum bid amount needed to win the requested quantity, wherein the quoted minimum bid amount has a lower per unit price than the per unit price of the current high bid quantity when the requested quantity is larger than the current high bid quantity and when a sum of the requested quantity and the current high bid quantity exceeds the number of units of products.

2. The system of claim 1, wherein the quoted minimum bid amount has a higher per unit price than the per unit price of the current high bid quantity when the requested quantity is not higher than the current high bid quantity, regardless of whether the sum of the requested quantity and the current high bid quantity exceeds the number of units of products.

3. The system of claim 2, wherein the quoted minimum bid amount has a per unit price that is higher than the per unit price of the current high bid quantity by a predefined bid increment when the requested quantity is not higher than the current high bid quantity and when the sum of the requested quantity and the current high bid quantity exceeds the number of units of products.

4. The system of claim 1, wherein the price varying information comprises a pricing model parameter that defines at least in part a shape of the price-quantity curve.

5. The system of claim 4, wherein the price-quantity curve is characterized by a strictly monotonously decreasing function of the parity unit prices.

6. The system of claim 1, wherein the auction set up process comprises obtaining from the seller system bid increment information that defines a bid increment amount.

7. The system of claim 1, wherein the products comprise goods.

8. The system of claim 1, wherein the products comprise services.

9. The system of claim 1, wherein the auction set up process includes obtaining, from the seller system, information that defines a bidding period.

10. The system of claim 9, wherein the auction set up process ends before the bidding period begins.

11. The system of claim 10, wherein the information that defines the bidding period includes an auction start date/time and an auction end date/time.

12. A method for auctioning products online, comprising:
    performing an auction set up process that includes receiving from a seller a total lot quantity and price varying information that defines at least a price-quantity curve for the products to be auctioned;
    receiving from a buyer system information representative of a requested quantity;
    comparing the requested quantity to a quantity of a current high bid; and
    quoting a minimum bid amount needed to win the requested quantity,
    wherein the minimum bid amount has a lower per unit price than the per unit price of the current high bid when the requested quantity is larger than the current high bid quantity and when a sum of the requested quantity and the current high bid quantity exceeds the number of units of products.

13. The method of claim 12, wherein the minimum bid amount has a higher per unit price than the per unit price of the current high bid when the requested quantity is not higher than the current high bid quantity, regardless of whether the sum of the requested quantity and the current high bid quantity exceeds the number of units of products.

14. The method of claim 13, wherein the minimum bid amount has a per unit price that is higher than the per unit price of the current high bid by a predefined bid increment when the requested quantity is not higher than the current high bid quantity and when the sum of the requested quantity and the current high bid quantity exceeds the number of units of products.

15. The method of claim 12, wherein the price varying information comprises a pricing model parameter that defines at least in part a shape of the price-quantity curve.

16. The method of claim 15, wherein the price-quantity curve is characterized by a strictly monotonously decreasing function of the parity unit prices.

17. The method of claim 12, wherein the auction set up process comprises accepting bid increment information that defines a bid increment amount.

18. The method of claim 12, wherein the products comprise goods.

19. The method of claim 12, wherein the products comprise services.

20. The method of claim 12, wherein the auction set up process includes obtaining, from the seller system, information that defines a bidding period.

21. The method of claim 20, wherein the auction set up process ends before the bidding period begins.

22. The method of claim 20, wherein the information that defines the bidding period includes an auction start date/time and an auction end date/time.

\* \* \* \* \*